United States Patent [19]

Mitchell

[11] Patent Number: 4,913,825
[45] Date of Patent: Apr. 3, 1990

[54] METHOD FOR CONTROLLING OVERSPRAY IN PAINT SPRAY BOOTHS

[75] Inventor: David B. Mitchell, Palatine, Ill.

[73] Assignee: W. R. Grace & Co.-Conn., New York, N.Y.

[21] Appl. No.: 199,508

[22] Filed: May 27, 1988

[51] Int. Cl.⁴ .................................................. C02F 1/56
[52] U.S. Cl. ..................................... 210/705; 210/712; 210/725; 210/727; 210/728; 55/85
[58] Field of Search .................. 55/84, 85; 134/38; 210/705, 712, 725, 727, 728, 730, 735, 736; 427/331

[56] References Cited

U.S. PATENT DOCUMENTS

| | | | |
|---|---|---|---|
| 3,515,575 | 6/1970 | Arnold | 55/84 |
| 3,953,330 | 4/1976 | Tonkyn et al. | 210/736 |
| 4,656,059 | 4/1987 | Mizuno et al. | 210/729 |
| 4,753,738 | 6/1988 | Huang | 210/727 |

Primary Examiner—Peter Hruskoci
Attorney, Agent, or Firm—James P. Barr

[57] ABSTRACT

A novel treatment scenario which considerably improves detackification of paint overspray consisting of undiluted high solids enamel, epoxy resin or polyurethanes in the wash water of paint spray booths is disclosed, comprised of (i) a dialkylamine-epihalohydrin in combination with a modified tannin and/or (ii) a dialkylamine epihalohydrin in combination with a melamine formaldehyde type polymer.

25 Claims, 1 Drawing Sheet

METHOD FOR CONTROLLING OVERSPRAY IN PAINT SPRAY BOOTHS

FIELD OF THE INVENTION

This invention relates to treatment of paint spray booth wastes and in particular to treatment of waste paint accumulated in spray booth process water using treatment formulations which detackify and prevent agglomeration of paint spray particles.

BACKGROUND OF THE INVENTION

Commercial paint spraying operations are typically performed in spray painting booths. During these operations, less than half of the paint used may actually coat the surface to be painted, with the remainder representing overspray. In the spray application of paints, lacquers, enamels, polyurethanes, epoxy resins and like finishes, it is normally necessary to trap the oversprayed coating materials in some way to avoid their building up on the walls and exhaust system surfaces of the spray booth. In many large industrial installations, including especially auto body painting systems, this is accomplished by the use of water curtains on the interior booth walls, whereby the oversprayed coating material is trapped in water which cascades down the walls of the booth and lies underneath it. Normally this water is recirculated over the walls from a reservoir of water underneath the booth or in close proximity to it by means of pumps which are capable of moving a large flow of water through large diameter pipes. However, the agglomeration and accumulation of live coating material in the water supply of these installations results in serious problems, such as blockage of the pipes and pumps which circulate the water, and a build-up of paint on the walls of the booth beyond the water curtain. As more and more coating material is sprayed in the booth, the material removed from the air builds up in the water in the form of a tar-like coherent sludge which in a short time can foul the pumps and lines which circulate the booth's water. Furthermore, this sludge is extremely difficult to remove from the pump, lines, reservoir, and other internal surfaces of the system with which it comes in contact. The accumulation of raw paint masses in the bottom of the water reservoir also creates a serious problem when the system is periodically cleaned out, much effort being required to remove the heavy build-up of coating material on the bottom of the reservoir.

It is, therefore, desirable to treat the water in the booth in such a way as to render the oversprayed coating material free of stickiness and tackiness so that it will readily separate itself from the water, not adhere to the curtain walls, pipes, pumps and other internals of the spray booth system, and remain in a floating detackified condition.

One approach to detackification has been to combine certain polymeric materials with amphoteric metals. Thus, for example, U.S. Pat. No. 3,861,887 discloses treatment of paint booth wash water with a blend of polycationic water dispersible polymer with a water-soluble salt of an amphoteric metal to reduce the tackiness of paint. One problem with this approach is that use of metals, such as zinc, can create additional disposal concerns regarding the wastewater and sludge.

Another approach has been to use clay-based treatment. For example, U.S. Pat. No. 4,504,395 discloses that certain hectorite clays can be effectively used to detackify oversprayed paint. A problem with this approach is that the sludge produced using clays can be difficult to dewater, resulting in larger volumes of potentially hazardous materials requiring haul-out to a secure landfill.

Other approaches using various treatments have also reportedly been considered. However, there remains a need for effective paint spray treatment which detackifies paint overspray and which does not aggrevate waste sludge disposal problems.

SUMMARY OF THE INVENTION

In accordance with this invention, oversprayed paint particles in paint spray booth water are detackified by using in combination: (a) a first component selected from the group of polymers consisting of those derived by reacting dimethylamine, diethylamine, or methylethylamine with an epihalohydrin; and (b) a second component selected from the group of compounds consisting of (i) modified tannin compounds formed by reacting condensed tannin with both an aldehyde and an amino compound, and (ii) reaction products of an aldehyde with either a urea or an aminotriazine, or both. This combination provides surprisingly effective control of paint spray booth wastes, particularly at a pH between about 8.0 and about 11.0, and can serve as the basis for a paint spray control program which is organic in nature. Indeed, the preferred combination is free of clays and amphoteric metals, such as zinc. Hydrolyzed polyacrylamide polymer can be used to flocculate paint and thus improve dewatering. However, the combination of this invention, by itself, can often provide a sludge which is readily dewatered, particularly when used to control polyurethanes, epoxy resins and undiluted high solids enamel paints.

It is an object of this invention to inhibit the accumulation of paint within the eliminators, recirculation pumps, sludge tanks, water curtains, and other equipment of paint spray booth apparatus.

It is another object of the invention to provide for improved removal of detackified paint from an aqueous system.

It is still another object of this invention to provide a detackified sludge which is readily dewatered.

It is yet another object of this invention to provide for detackification which can be practiced without relying on toxic metals as essential components.

These and other objects and advantages of the present invention will become apparent from the following detailed description of the invention.

DETAILED DESCRIPTION OF THE INVENTION

Figure 1:
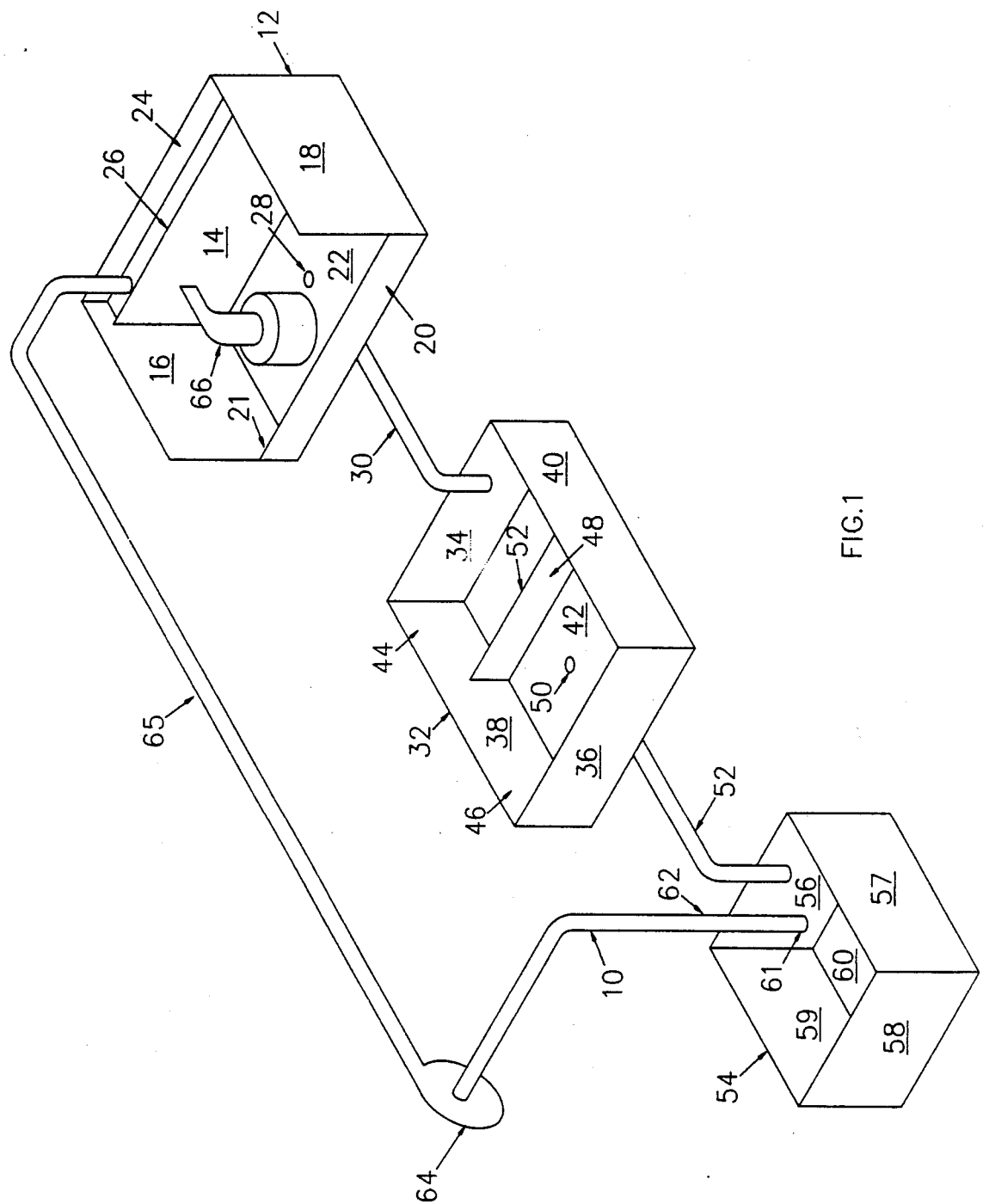
FIG. 1 is a schematic isometric drawing of an apparatus used for evaluating control of paint overspray.

The present invention is directed to the use of two cationic components, each comprising selected organic compounds, in combination to achieve advantageous detackification of paint spray booth wastes. One of those components is selected from polymers derived by reacting dimethylamine, diethylamine, or methylethylamine with an epihalohydrin, preferably epichlorohydrin. Polymers of this type are disclosed in U.S. Pat. No. 3,738,945, which is hereby incorporated herein in its entirety by reference. The preferred molecular weight range is from about 50,000 to 200,000. Preferably, these dialkylamine-epihalohydrin polymers have a charge density of between about 3.0 and 8.0 milliequivalents per gram.

The second component is selected from the group consisting of certain modified tannins and certain condensation reaction products of aldehydes and ureas and/or aminotriazines. The modified tannin compounds which may be used in this invention are those formed by reacting condensed tannins such as extracts from quebracho wood or wattle bark, which are polyphenolic, with both an aldehyde, particularly formaldehyde, and an amino compound such as monoethanolamine, ammonia, and ammonium salts such as ammonium chloride. The reaction between formaldehyde and amino compounds and a compound, such as a phenolic compound, which contains reactive hydrogen atoms is known as the Mannich Reaction. The molecular weight of the preferred modified tannin-materials is considered to be within the range of 5,000 to 50,000.

Preferably, the tannin-based materials used in this invention have a charge density of between about 0.7 and about 5.0 milliequivalents per gram (meq/g).

Preferably, the tannin-based component utilized in this invention is made in accordance with disclosure of U.S. Pat. No. 4,558,080, which is hereby incorporated in its entirety by reference. Such a component uses condensed polyphenolic tannins and is prepared under slightly acidic conditions where the pH is less than 7 and where the molar ratio of the primary amine from the amino compound to the tannin repeating unit is from about 1.5:1 to about 3.0:1. To form a tannin-based component having a long shelf life, the reaction mixture is heated at a temperature of from about 150° to about 200° Fahrenheit until a reaction product forms which has an intermediate viscosity within a "key intermediate viscosity range" and the reaction is then terminated by external cooling, by adding quench water, and by adding acid. The "key intermediate viscosity range" is determined experimentally for each flocculant reaction system and is generally within a narrow range between about 2 and about 100 cps when measured at 180° Fahrenheit on a Brookfield LVT viscosimeter. The reaction is terminated by external cooling, by adding quench water, and by adding acid. The solids content of the resultant liquid flocculant is preferably about 20% to about 60% by weight and the pH is preferably less than 3.0. Preferably an antifoamer material such as silicon anti-foamer exemplified by Silicone B made by Dow Chemical Co., a mineral seal oil, or a high molecular weight alcohol is added to prevent excessive foaming.

U.S. Pat. No. 4,558,080 describes the production of a tannin-based flocculant using monoethanolamine as the amino compound and formaldehyde as the aldehyde. As described therein, a reactor containing 130.75 grams of de-ionized water was preheated to 150° F. Gradually 125.75 grams of Mimosa extract available as a spray-dried tannin powder sold by Canadian Packers, Ltd., was gradually added while stirring. The temperature was maintained at about 130° to 140° Fahrenheit. After complete dissolution, the material was cooled to 110° Fahrenheit. Then 0.15 grams of a silicon antifoamer, Silicone B made by Dow Chemical, was added.

To the aqueous tannin solution, 47.65 grams of monoethanolamine was added to yield a primary amine to tannin ratio of 1.86:1 while mixing, and the temperature of the reaction mixture was allowed to rise to 130° Fahrenheit and it was maintained at this temperature until all of the amine was added. In order to maintain the acid conditions of the reaction mixture 80 grams of a 32% active hydrochloric acid was added to bring the pH in the range of 6.4 to 6.7 and the temperature was allowed to rise to 140° Fahrenheit. Upon forming its initial tannin/amine solution, the mixture was then cooled to 120° Fahrenheit.

Next, the formaldehyde was added in the form of 62.70 grams of 37% active formaldehyde and the temperature during this addition was maintained between 120° and 130° Fahrenheit. As the formaldehyde was mixed with the previous solution the solution was heated to initiate the reaction and the temperature was controlled so that it was not allowed to go above about 180° Fahrenheit. As the reaction proceeded the viscosity of the solution was monitored using a Brookfield LVT viscosimeter where the samples were measured at temperatures of about 178° to 180° Fahrenheit. When the viscosity reading reached 38 to 40 cps, the desired degree of reaction was obtained. At this point, the reaction material was quenched by the addition of external cooling and 45.20 grams of de-ionized water and 7.8 grams of muriatic acid to obtain a final pH of 2.4 and to obtain a solids content of about 40.2% and a final viscosity of 246 cps.

A similar composition produced in accordance with U.S. Pat. No. 4,558,080 was available commercially as the product Klar-Aid 2400, produced by Dearborn Division, W. R. Grace & Co. This composition contained approximately 40% of a modified cationic tannin (mol. wt. about 10,000; charge density about 1.5–4.0) formed as the reaction product of Mimosa extract, formaldehyde, and monoethanolamine. This tannin-based product was used in the following non-limiting examples to demonstrate its relative effectiveness alone and in combination with the polymers derived from epihalohydrins and dialkylamines.

EXAMPLE I

The effectiveness of the combination of this invention in detackifying paint overspray was evaluated using the paint spray apparatus depicted schematically in FIG. 1. The apparatus (10) comprises a spray chamber (12) which has a front wall (14), side walls (16) and (18), a rear wall (20) and a floor (22). An elevated reservoir (24) is positioned at the front wall (14) with the top edge (26) of the front wall forming the lowest side of the reservoir such that water overflowing from the reservoir form a water curtain for the front wall (14).

An outlet (28) is provided in the spray chamber floor (22), and water overflowing from the reservoir passes into outlet (28) and through piping (30) to a second mixing chamber (32). The second chamber (32) comprises end walls (34) and (36), side walls (38) and (40), and floor (42), and is divided into a first compartment (44) and a second compartment (46) by a weir (48). Water flowing from piping (30) flows into the first compartment, and an outlet (50) is provided in the floor of the second compartment. The top edge (52) of the weir terminates below the walls of the mixing chamber such that water overflows from the first compartment into the second compartment, and then into the outlet (50). Piping (52) directs the water from the outlet (50) into a third mixing chamber (54) which comprises four walls (56) (57) (58) and (59), and floor (60). The open end (61) of the inlet piping (62) for pump (64) is positioned in the third mixing chamber (54) such that the pump (64) can be used to withdraw water from the third mixing chamber. Water pumped from the mixing chamber (54) is directed through pump outlet piping (65) into the elevated reservoir (24).

The top edge (21) of the rear wall (20) in spray chamber (12) terminates lower than the front top edge (26) of the front wall (14), and a paint spray gun (66) is positioned such that paint spray is directed toward the front wall (14) from a distance of approximately 9 inches. The capacity of the recirculating water system is about 14 liters and the recirculation rate is approximately 7.6 liters per minute.

In operation water circulation is begun to provide a curtain of water overflowing from top edge (26) toward floor (22) and passing adjacent to the front wall (14) of spray chamber (12). Paint is then sprayed from spray gun (66) toward the front wall (14) such that the spray becomes entrained in the water curtain. Generally, paint is sprayed at a rate within the range of from about 2.5 milliliters per minute to about 5.0 milliliters per minute, and the spraying continues until about 100 milliliters of paint has been sprayed.

The treatment combinations disclosed herein are added to the Paint Spray Booth after the 14 liters of water have been measured and placed in the booth. After the treatment has mixed (5-15 minutes) the paint (approximately 100 ml.) is sprayed at the front wall (14). The degree of paint detackification is continually assessed in the second (32) and third (54) mixing chambers by rubbing the paint between forefinger and thumb. If the paint is completely detackified it will roll between forefinger and thumb. If the detackification is poor the paint will tend to smear.

In a first run, about 1400 ppm modified tannin and about 500 ppm of a dimethylamine epichlorohydrin polymer (i.e., a DMA-EPI polymer) were added to the water. The DMA-EPI product used was Aquafloc 458 available from Dearborn Division, W. R. Grace & Co. reportedly having a molecular weight of about 75,000 and a charge density of about 7.8 meq/g. The water was adjusted to a pH of 10 using caustic. After water circulation was begun, a clear coat enamel paint was sprayed toward the water curtain in the spray chamber at approximately 3 milliliters per minute. After a total of 100 milliliters of paint had been sprayed, the floating solids in the second and third mixing chambers were examined and were rated good to excellent.

A second run was made using the same procedure as the first run, except that a white base enamel paint was used. The floating solids produced in this run were rated excellent and were considered to be completely detackified.

A third run was made using the same procedure as the first, except that a white base crystal coat enamel paint was used. The paint was applied at a rate between about 3 and 5 milliliters per minute. The floating solids produced in this run were rated from fair to good. The same evaluation procedure using approximately 2000 ppm of a clay (bentonite) based program provided only fair results. Thus, treatment in accordance with this invention was considered to outperform clay-based programs for treating the same paint, and was considered suitable for commerical detackification.

A fourth run was made using the same procedure as the first run except that a different clear enamel was used. The floating solids were rated fair to good. This result was considered equivalent to results using an amphoteric metal/DMA-EPI polymer combination treatment at pH 10, and superior to results with a clay-based treatment program.

A fifth run was made using the same procedure as the first run except that the 500 ppm of DMA-EPI polymer added in the first run was not used. Furthermore a black, modified epoxy resin paint was used in this run and was applied at a rate between about 2.5 and 3.3 milliliters per minute. The floating solids were rated as fair. The paint was somewhat tacky and cohered together to form one large floating ball of paint. This treatment was not considered suitable for commercial detackification.

A sixth run was made using the same treatment procedure as the first run except that a black, modified epoxy resin paint was used as in run 5. The paint was applied at a rate between about 2.5 and 3.3 milliliters per minute. The floating solids were rated excellent. This run, when compared to the fifth run, demonstrated the importance of the dialkylamine-epihalohydrin polymer component in dispersing the floating paint across the surface of the water. It can be concluded that this allows further reaction between the treatment components and the paint.

A seventh run was made using the same procedure as the first run except that the 500 ppm of DMA-EPI polymer added in the first run was not used and a grey baking epoxy resin paint was sprayed. The paint was applied at a rate between about 2.5 and 3.3 milliliters per minute, and only 30 milliliters of paint were applied during the run. The floating solids were rated as excellent, and the paint floated as a dispersed film at the water surface. This is clearly a result of the differing paint formulation in runs 5 and 7. How the black and grey epoxy resin paints are different is not exactly known.

In an eighth run, about 3500 ppm of a product containing an amphoteric metal (available from Drew Chemical as Amerfloc 8) and about 3 ppm of a product containing DMA-EPI polymer (available from Drew Chemical as Amerfloc Plus 5260) were added to the water. The water was adjusted to a pH of 10 using caustic. After the water and treatment circulation was begun, a black, modified epoxy resin paint was sprayed toward the water curtain in the spray chamber at approximately 2.5 to 3.3 milliliters per minute. After a total of 100 milliliters of paint had been sprayed, the floating solids in the second and third chambers were examined and rated excellent. This run is considered representative of amphoteric metal/DMA-EPI polymer combination treatment.

In a ninth run, about 1400 ppm of a modified tannin and about 357 ppm of a dialkylamine-epihalohydrin (added as Aquafloc 458) were added to the water, and the water was adjusted to a pH of 9 using caustic. After water circulation was begun, a white polyurethane paint was sprayed toward the water curtain in the spray chamber at approximately 2.5-3.3 milliliters per minute. After a total of 100 milliliters of paint had been sprayed, the floating solids in the second and third chambers were examined and were rated good to excellent. A slight degree of foaming was observed.

In a tenth run, about 1400 ppm of a modified tannin and about 357 ppm of a dialkylamine-epihalohydrin (added as Aquafloc 458) were added to the water, and the water was adjusted to a pH of 10 using caustic. After water circulation was begun, a black polyurethane paint was sprayed toward the water curtain in the spray chamber at approximately 2.5-3.3 milliliters per minute. After a total of 100 milliliters of paint had been sprayed, the floating solids in the storage chamber were examined and were rated excellent.

An eleventh run was made using the same procedure as the tenth run, except that the 357 ppm of a dialkylamine-epihalohydrin (added as Aquafloc 458) added in the tenth run was absent and a primer polyurethane was sprayed. The paint was applied at a rate of 2.5-3.3 ml/min. The floating solids were rated as excellent.

By comparative screening a highly charged dimethylamine-epichlorohydrin was determined to be a more effective cationic dispersant in combination with a modified tannin than either a low to medium charged cationic starch or another highly charged dimethylamine-epihalohydrin product having a molecular weight of about 250,000.

It is noted that the tannin-based component used in the examples was not considered a true solution, but more particularly, a hydrocolloidal suspension in which part of the molecule keeps the tannin in solution while the ethercyclic group is hydrophobic. As the water pH is raised above a level of about 6.5, the solubility of the tannin-based component decreases and a small floc is formed. Accordingly, after addition of the tannin to the water of the paint spray apparatus, the pH is preferably brought within the range of about 8 to 11 to encourage formation of such a floc.

With regard to the modified tannin component, it is further noted that while the preferred tannin-based component has been referred to above, it is understood that other modified tannins may be prepared by aqueous reaction of a tannin with an amino compound and an aldehyde. Mimosa extract is shown above to produce a particularly suitable floc, but both quebracho extract and wattle extract are preferred from the standpoint of availability and proven suitability as floc-forming reactants. Other suitable tannins can be obtained from various wood and vegetation materials found throughout the world. Tannins are, in fact, a large group of water-soluble, complex organic compounds. Almost every tree or shrub that grows contains some tanins in the leaves, twigs, barks, wood, or fruit. Examples of barks are wattle, mangrove, oak, eucalyptus, hemlock, pine, larch, and willow. Examples of woods are the quebracho, chestnut, oak and urunday.

Examples of fruits are myrobalans, valonia, divi-divi, tara, and algarrobilla. Examples of leaves are sumac and gambier and examples of roots are canaigre and palmetto. The tannin extracts of many of these materials, and in particular the condensed polyphenolic tannin extracts, are thought to be sufficiently reactive to provide adequate coagulant qualities.

The preferred aldehyde for preparing the modified tannin used in this invention is formaldehyde which can be used in the form of 37% active formaldehyde solution. This is also commercially available as formalin which is an aqueous solution of 37% formaldehyde which has been stabilized with from 6-15% methanol. Other commercial grades of formaldehyde and its polymers could be used. Such commercial grades include 44, 45, and 50% low-methanol formaldehyde, solutions of formaldehyde in methyl, propyl, n-butyl, and isobutyl alcohol, paraformaldehyde and trioxane. When using solid paraformaldehyde, care must be taken that it all dissolves.

Other aldehyde containing or generating reactants are organic chemical compounds which contain at least one aldehyde group therein, as are well-known and include, for example, formaldehyde, acetaldehyde, propionaldehyde, glycolaldehyde, glyoxylic acid and the like or polyaldehydes, i.e. organic compounds having more than one aldehyde group in the compound, such as glyoxal, paraformaldehyde and the like. Other suitable aldehyde reactants include aldehyde generating agents, i.e. known organic compounds capable of forming an aldehyde group in site, such as melamine-formaldehyde monomeric products and derivatives such as tri and hexa(methylol) melamine and the tri and hexa ($C_1$–$C_3$ alkoxymethyl) melamine. Such materials can be formed by known conventional methods. The alkyl blocked derivatives are commercially available, are stable to self-polymerization and are, therefore, preferred.

Particularly preferred are amino compounds that include monoethanolamine, ammonia and water soluble inorganic ammonium salts such as ammonium chloride. Other preferred materials include primary amines such as monoethanolamine, methylamine and ethylamine. Secondary amines and other amine compounds are also acceptable. The primary amines are preferred for preparing the modified tannin since they are the more reactive amines than secondary or tertiary amines.

If the tannin-based component is used alone to treat certain paints (e.g., certain epoxy resin base colors) the floating paint can still agglomerate to form a large, partially detackified paint ball. Such agglomeration is considered unacceptable for commercial paint spray control. The dialkylamine-epihalohydrin component, particularly when highly charged, appears to stabilize the small floc, and usually decreases its size. The dialkylamine-epihalohydrin component is preferably added after the modified tannin to allow the small floc to form before stabilization. Without limiting the invention to a particular theory of operation, the addition of the dialkylamine-epihalohydrin component is considered important for providing a floc with relatively high surface area, thereby improving detackification by facilitating contact between the floc which is dispersed in water circulating in the paint spray apparatus, and paint which becomes entrained therein. Flotation of the waste solids is also facilitated since the settling velocity of the floc is generally reduced by addition of the amine-epihalohydrin component of this invention. Thus, the detackified paint particles produced in accordance with this invention are preferably collected by conventional flotation.

An important benefit of producing detackified paint which floats is that some of the resulting sludges, such as those obtained with certain high solids base coats, are easily dewatered even without further chemical treatment. For example, a sludge containing 68 % solids was mechanically obtained using a laboratory plate and frame press. Nevertheless, following detackification of the water-entrained paint in accordance with this invention, and removal of the detackified particles from the system, as by flotation, further chemical treatment may be provided to improve dewatering of the sludge. For example, as regards high solids enamel clear coat paint, conventional nonionic or anionic polymeric flocculants such as an anionic polyacrylamide polymer can be advantageously used to enhance sludge dewaterability.

As indicated above, the modified tannin component of the treatment combination of this invention may be replaced with products derived by reacting aldehydes with certain nitrogen-containing compounds which condense with aldehydes. Certain of these materials are described in U.S. Pat. No. 4,629,572 which is incorporated herein by reference. The preferred aldehyde for preparing these condensates is formaldehyde, although other aldehydes, such as acetaldehyde, acrolein, crotonaldehyde, etc. may be used. Formaldehyde may be used in the gaseous state or in one of its polymer forms, such as paraformaldehyde or formalin.

The nitrogen-containing compound may be a resin-forming urea or a resin-forming aminotriazine, such as urea, melamine, thiourea, guanidine, dicyandiamide, dicyanamidine, alkylureas, cyclic alkyleneureas, aminotriazines other than melamine, such as melam, melem, ammelide, and ammeline, substituted melamines, such as butylmelamine or phenylmelamine, guanamines, such as acetoguanamine, benzoguanamine, tetrahydrobenzoguanamine, stearoguanamine, etc. The preferred nitrogen-containing resin-forming compounds are urea, melamine and mixtures of these. The preferred resins are urea-formaldehyde resin, melamine-formaldehyde resin and urea-melamine-formaldehyde resin. In this discussion the nitrogen compound will simply be referred to as melamine, and formaldehyde will be used as representative of the aldehyde component.

As indicated in U.S. Pat. No. 4,629,572, suitable water-dispersible melamine-formaldehyde resins can be prepared by reacting formaldehyde and melamine in the ratio of about 1 to 10 and usually about 2 to 8 moles of formaldehyde per mole of melamine. The product may be made cationic by reaction with an acid such as hydrochloric acid. The preparaton of the melamine-formaldehyde resin is not a part of the invention. Any of the well-known melamine-formaldehyde products available on the market may be used in the invention or, if desired, particular melamine-formaldehyde resins may be made. Melamine formaldehyde compounds which may be used in this invention include those formed by reacting melamine with formaldehyde, for example, in the manner disclosed in U.S. Pat. No. 2,345,543 which is incorporated herein by reference; or by reacting both melamine and urea with formaldehyde in the manner described in U.S. Pat. No. 2,485,079 which is also incorporated herein by reference. The melamine-formaldehyde resin is cured sufficiently to render the product water-dispersible but is not cured so hard as to form an insoluble and infusible product. The melamine-formaldehyde resin is usually used in the form of a colloidal suspension achieved by raising the pH of the booth water to about 10.0 with caustic. Typically, when aminotriazole-formaldehyde derivatives are used in accordance with this invention, they have a molecular weight between about 5,000 and 20,000 and a charge density between about 1.0 and 25.0 meq/g.

Practice if the treatment combinations of this invention with a melamine-formaldehyde product as a second component will be further apparent from the following non-limiting Example.

EXAMPLE II

The apparatus of FIG. 1 was used in the general manner described in Example I. In a first run of this example however, about 800 ppm of a melamine formaldehyde polymer and about 250 ppm of a dimethylamine epichlorohydrin polymer (added as Aquafloc 458) were added to the water circulating in the paint spray apparatus. The melamine-formaldehyde product used was Deartek 2401 available from Dearborn Division, W. R. Grace & Co. and reportedly having a molecular weight of about 10,000 and a charge density of about 20 meq/g. The water was adjusted to a pH of 10 using caustic.

After water circulation was begun a polyurethane-based paint was at a rate between about 2.5 and 3.3 milliliters per minute. After a total 100 milliliters of paint had been sprayed the floating solids in the second and third mixing chambers were examined and were rated excellent with respect to detackification.

A second run was made using the same procedure as the first run of this example, except that the paint sprayed was a black high solids enamel which had been prediluted with an organic solvent. The detackification of the floating solids in the mixing chambers was rated excellent.

A third run was made using the same procedure as the first run of this example, except that the paint sprayed was a clear-coat high solids enamel which had been prediluted with an organic solvent. The detackification of the floating solids in the mixing chambers was rated only fair to poor.

A fourth run was made using the same procedure as the first run of this example except that the paint sprayed was a red base coat high solids enamel which had been prediluted with an organic solvent. The detackification of the floating solids in the mixing chambers was rated only fair to poor.

A fifth run was made using the same procedure as the first run of this example except that the paint sprayed was a mixture (20 milliliters each) of yellow, blue metallic, brown metallic, brown and white high solids enamels which had been prediluted with an organic solvent. The detackification of the floating solids in the mixing chambers was rated good to excellent.

As is well-known in the paint spray industry, not every detackifier will detackify every type of paint with the same effectiveness. The invention described herein is considered particularly effective for detackifying spray booth water containing particles from polyurethane, epoxy resin, or undiluted high solids enamel paint spray, as demonstrated in runs 1, 2, 3, 4, 6, 7, 9 and 11 of Example I and run 1 of Example II. However, it is noted that the treatment was found to produce sticky, smearable solids when used to treat high solids enamel paints which had been pre-diluted with various organic solvent formulations by the end users. Thus, except for some instances where the aldehyde-urea/aminotriazine polymer is used as the second component, use of the combination disclosed herein is considered to provide only fair to poor results with such pre-diluted paint formulations. Organic solvents used for predilution of enamel paints may include, for example, methylethyl ketone, xylene, toluene, acetone, butanol, hexane, or a combination of these and other conventional paint solvents. In any case, it is considered preferable that the paint spray booth water have an alkalinity of at least about 150 ppm as $CaCO_3$ when high solids enamel paints are detackified in accordance with this invention.

Generally, the dialkylamine-epihalohydrin component is added to the paint spray apparatus water at a concentration of at least about 100 ppm, preferably between about 250 ppm and 500 ppm. The modified tannin, when used as the second component, is generally added at a concentration of at least about 500 ppm, preferably between about 1000 ppm and 2000 ppm; while the condensates of aldehyde with urea and/or aminotriazine, when used as the second component, is generally added at a concentration of at least about 150 ppm, preferably between about 200 ppm and 1000 ppm. The two components are preferably used in a weight ratio of dialkylamine-epichlorohydrin polymer to second component of between about 1:2 and 1:10 whether the second component is the modified tannin or the aldehyde-urea/aminotriazine polymer. The two components are preferably separately added to the water being treated with the second component being added first. However, compositions comprising both components, particularly in the proportions recited above, can be mixed prior to treatment and then used advantageously to treat spray booth wastewater, and accordingly, are considered to be within the scope of this invention. Such compositions typically contain between 1 and 30, preferably between 1 and 10 weight percent total of the two components of this invention. The storage stability of particular compositions of this invention may limit the length of time between mixing of components and effective use.

The combinations of this invention are preferably free of clays so as to avoid dewatering problems associated with clay materials. The combinations of this invention are also preferably free of amphoteric metals, such as zinc, which can produce disposal concerns when the detackified solids are removed from the paint spray facility. Indeed, the preferred combinations of this invention are organic in nature, and may advantageously consist essentially of the two components discussed above.

The examples described herein include various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method of detackifying spray booth water containing particles from paint spray comprising the steps of:
   (a) adding to the spray booth water at least about 100 ppm of polymers selected from the group consisting of those derived by reacting dimethylamine, diethylamine, or methylethylamine with an epihalohydrin;
   (b) adding to the spray booth water at least about 500 ppm of compounds selected from the group consisting of modified tannin compounds formed by reacting a condensed tannin with both an amino compound and an aldehyde;
   (c) providing a pH above about 6.5 in the spray booth water such that the modified tannin added in step (b) forms a floc which is dispersed in the spray booth water for detackification, with the polymer added in step (a) stabilizing said floc and improving detackification;
   and (d) separating the floc and paint particles from said spray booth water.

2. The method of claim 1 wherein the spray booth water contains particles from polyurethane paint spray, particles from epoxy resin paint spray, or particles from undiluted high solids enamel paint spray; and wherein the spray booth water has an alkalinity of at least about 150 ppm as $CaCO_3$ when high solids enamel paints are present.

3. The method of claim 2 wherein between about 1000 ppm and 2000 ppm of modified tannin is added during step (b).

4. The method of claim 3 wherein the tannin used in producing the second component is extracted from quebracho wood or wattle bark; the amino compound used is monoethanolamine, methylamine, or ammonium chloride; and the aldehyde used is formaldehyde.

5. The method of claim 4 wherein between about 250 ppm and 500 ppm of a reaction product of dimethylamine and epichlorohydrin is added during step (a).

6. The method of claim 1 wherein the polymers added at step (a) have a charge density of between about 3.0–8.0 meq/g.

7. The method of claim 1 wherein the compound added at step (b) has a charge density of between about 0.7 and 5.0.

8. The method of claim 7 wherein the polymers added at step (a) have a molecular weight between about 50,000 and 200,000.

9. The method of claim 8 wherein the compounds added at step (b) have a molecular weight between about 5,000 and 50,000.

10. The method of claim 1 wherein the pH of the spray booth water is between about 8 and about 11.

11. The method of claim 10 wherein the modified tannin is a product of a process including the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

12. The method of claim 1 wherein no clay is added during detackification.

13. The method of claim 1 wherein no amphoteric metals are added during detackification.

14. The method of claim 1 wherein the polymer of step (a) and the compound of step (b) are added as an aqueous composition containing between about 1 and 30 weight percent total of said additives.

15. The method of claim 1 wherein the polymer of step (a) is added after the compound of step (b).

16. The method of claim 1 wherein said modified tannin is a product of a process including the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

17. A method of detackifying spray booth water containing particles from paint spray without using clay comprising the steps of:
 (a) adding to the spray booth water as one component of a detackifying combination at least about 100 ppm of polymers selected from the group consisting of those derived by reacting dimethylamine, diethylamine, or methylethylamine with an epihalohydrin;
 (b) adding to the spray booth water as another component of said detackifying combination at least about 500 ppm modified tannin compounds which have molecular weights of at least about 5000 and which are formed by reacting a condensed tannin with both an amino compound and an aldehyde;
 (c) providing a pH above about 6.5 in the spray booth water such that the component added in step (b) forms a floc which is dispersed in the spray booth water for detackification, with the component added in step (a) stabilizing said floc and improving detackification;
 and (d) separating the floc and paint particles from said spray booth water.

18. The method of claim 17 wherein between about 250 ppm and 500 ppm of a reaction product of dimethylamine and epichlorohydrin is added during step (a).

19. The method of claim 18 wherein the polymers added at step (a) have a mol weight between about 50,000 and 200,000 and a charge density of between about 3.0 and 8.0 meq/g.

20. The method of claim 17 wherein no amphoteric metals are added during detackification.

21. The method of claim 17 wherein the polymer of step (a) and the compound of step (b) are added as an aqueous composition containing between about 1 and 30 weight percent total of said additives.

22. The method of claim 17 wherein the spray booth water contains particles from polyurethane paint spray, epoxy resin paint spray, or undiluted high solids enamel paint spray.

23. The method of claim 17 wherein the pH of the spray booth water is between about 8 and about 11.

24. The method of claim 17 wherein the detackified particles are collected by flotation and dewatered without further chemical addition.

25. The method of claim 17 wherein the spray booth water contains particles from high solids enamel paint and has an alkalinity of at least about 150 ppm as $CaCO_3$.

* * * * *